United States Patent
Xia et al.

(10) Patent No.: US 9,353,197 B2
(45) Date of Patent: May 31, 2016

(54) CATALYST COMPONENT FOR OLEFIN POLYMERIZATION AND PREPARATION METHOD THEREOF

(75) Inventors: Xianzhi Xia, Beijing (CN); Jin Zhao, Beijing (CN); Yuexiang Liu, Beijing (CN); Jigui Zhang, Beijing (CN); Weili Li, Beijing (CN); Yang Tan, Beijing (CN); Suzhen Qiao, Beijing (CN); Renqi Peng, Beijing (CN); Ping Gao, Beijing (CN); Maoping Yin, Beijing (CN); Tianyi Zhang, Beijing (CN)

(73) Assignees: China Petroleum and Chemical Corporation, Beijing (CN); Beijing Research Institute of Chemical Industry, China Petroleum and Chemical Corporation, Beijing (CN)

( * ) Notice: Subject to any disclaimer, the term of this patent is extended or adjusted under 35 U.S.C. 154(b) by 592 days.

(21) Appl. No.: 13/502,508

(22) PCT Filed: Apr. 19, 2010

(86) PCT No.: PCT/CN2010/000534
§ 371 (c)(1),
(2), (4) Date: May 22, 2012

(87) PCT Pub. No.: WO2011/047522
PCT Pub. Date: Apr. 28, 2011

(65) Prior Publication Data
US 2012/0226004 A1  Sep. 6, 2012

(30) Foreign Application Priority Data
Oct. 20, 2009 (CN) .......................... 2009 1 0236103

(51) Int. Cl.
C08F 4/76 (2006.01)
C08F 4/654 (2006.01)
C08F 4/658 (2006.01)
(Continued)

(52) U.S. Cl.
CPC ............... *C08F 10/00* (2013.01); *C08F 110/06* (2013.01)

(58) Field of Classification Search
None
See application file for complete search history.

(56) References Cited

U.S. PATENT DOCUMENTS 7,388,061 B2  6/2008  Gao et al.
2005/0267272 A1  12/2005  Kumamoto

FOREIGN PATENT DOCUMENTS

CN  1436796 A  8/2003
CN  1743346 A  3/2006
(Continued)

OTHER PUBLICATIONS
PCT International Search Report mailed Jul. 15, 2010, for International Application No. PCT/CN2010/00534, (4 pages).
(Continued)

*Primary Examiner* — Ling Choi
*Assistant Examiner* — Catherine S Branch
(74) *Attorney, Agent, or Firm* — Finnegan, Henderson, Farabow, Garrett & Dunner, LLP

(57) ABSTRACT

A catalyst component for olefin polymerization is disclosed, which comprises at least one diol ester type electron donor compound (a) and at least one diether type electron donor compound (b) among others, wherein the molar ratio of a to b is 0.55-50. A preparation method of the catalyst component, a catalyst comprising the catalyst component, and an olefin polymerization method using the catalyst which can especially be used for preparation of polypropylenes of low ash contents are also disclosed.

20 Claims, 1 Drawing Sheet

(51) Int. Cl.
C08F 4/649 (2006.01)
C08F 10/00 (2006.01)
C08F 110/06 (2006.01)

(56) References Cited

FOREIGN PATENT DOCUMENTS

| CN | 1743348 A | 3/2006 |
| CN | 101486776 A | 7/2009 |
| JP | 2005-517746 A | 6/2005 |
| WO | WO 2005/063832 A1 | 7/2005 |

OTHER PUBLICATIONS

PCT Written Opinion of the International Searching Authority mailed Jul. 15, 2010, for International Application No. PCT/CN2010/00534, (7 pages).

Extended European Search Report mailed Sep. 16, 2013, for European Patent Application No. 10824363.5, (3 pages).

CATALYST COMPONENT FOR OLEFIN POLYMERIZATION AND PREPARATION METHOD THEREOF

FIELD OF THE INVENTION

The present invention relates to a catalyst component for olefin polymerization and a process for the preparation thereof, and more specifically, to a spherical catalyst component for olefin polymerization comprising at least two electron donor compounds, i.e., an ester of diol and a diether, and a process for the preparation thereof. The present invention further relates to a catalyst comprising the catalyst component and to a process for polymerizing an olefin by using said catalyst, in particular a process for the production of a low ash polypropylene.

BACKGROUND ART

It is well known that, when used in olefin polymerization, in particular in propylene polymerization, a solid titanium based catalyst component comprising magnesium, titanium, a halogen and an internal electron donor as essential constituents exhibits a high catalytic activity and a high stereospecific property. As the internal electron donor compound develops, the catalyst for olefin polymerization has ceaselessly progressed. The catalysts using different internal electron donors may have different properties, for example, activity, hydrogen response property, the molecular weight distribution of the resulting polyolefin resin, and the like.

Patent applications CN 1436766A and CN 1552740A disclose esters of diol useful as internal electron donor in a catalyst for olefin polymerization. When used in propylene polymerization, a catalyst prepared by using the esters of diol as internal electron donor is characterized by a high polymerization activity and a broad molecular weight distribution of polymer. However, we have found that, when used in propylene polymerization, a spherical catalyst prepared by using the esters of diol as internal electron donor (using an adduct of magnesium dichloride and an alcohol as a carrier) exhibits a poor stereospecific property so that the resulting polypropylene has a low isotacticity.

Chinese patents CN1020448C and CN100348624C and Chinese patent application CN1141285A disclose diethers useful as internal electron donor. A catalyst using the diethers as internal electron donor has a relatively high activity and polymer isotacticity, and can give a polymer having a high isotacticity at a high yield even when no external electron donor is used. However, the polymer obtained by using such a catalyst in a single polymerization reactor process has a relatively narrow molecular weight distribution so that the application of the polymer is limited.

Some studies have improved the performance of a catalyst by improving the preparation process of the catalyst. The solid catalyst components obtained by using different preparation processes may be quite different from each other in microstructure so that the number of the active sites and the distribution of various active sites are different. As a result, the catalysts are quite different in performance. The improvements in catalyst preparation process include mainly the use of different magnesium dichloride carriers and different preparation processes and the optimization of the preparation conditions.

The enhancement of polymerization activity of a catalyst is all the while one of the most important study directions in the art. In recent years, as the demand for the superpure, low ash polypropylene increases, the demand for a catalyst, which can retain a high polymerization activity at a low alkyl aluminum concentration, is more and more imperious.

SUMMARY OF THE INVENTION

The inventors have found by a number of experiments that, when used in olefin polymerization, especially in propylene polymerization, a spherical catalyst prepared by using an ester of diol in combination with a 1,3-diether as internal electron donor, especially a spherical catalyst prepared by a preferred preparation process, will exhibit a superhigh polymerization activity (>150 kg PP/g catalyst) and a good stereospecific property, and that the resultant polymer has a broad molecular weight distribution and a low ash. The inventors have further found that this catalyst may retain a relatively high polymerization activity at a low alkyl aluminum concentration, and a good stereospecific property when no external electron donor or a relatively little amount of an external electron donor is used. Thus, by using this catalyst, it is possible to produce a low ash polypropylene directly in a polymerization reactor at a low Al/Ti molar ratio with no external electron donor or a minor amount of an external electron donor. On this basis, the invention has been made.

Thus, an object of the invention is to provide a catalyst component for olefin polymerization, which comprises, inter alia, at least one ester of diol type electron donor compound a and at least one diether type electron donor compound b, wherein the molar ratio of the electron donor compound a to the electron donor compound b ranges from 0.55 to 50.

A further object of the invention is to provide a process for the preparation of the catalyst component according to the invention.

A still further object of the invention is to provide a catalyst comprising the catalyst component according to the invention.

A still further object of the invention is to provide a process for the polymerization of propylene, which process uses the catalyst of the invention. Said process is especially useful in the production of a low ash polypropylene.

DETAILED DESCRIPTION OF THE PREFERRED EMBODIMENTS

Figure 1:
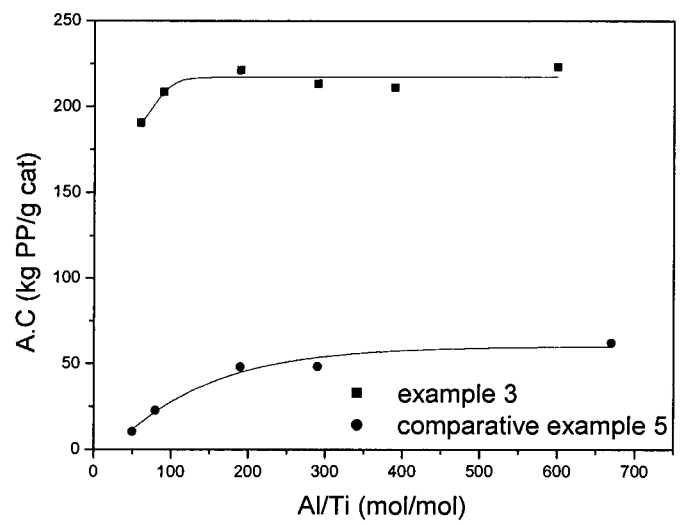
FIG. 1 is a plot of polymerization activity vs. Al/Ti molar ratio for the catalysts obtained in Example 3 and Comparative Example 5.

The term "polymerization" as used herein intends to include homopolymerization and copolymerization. The term "polymer" as used herein intends to include homopolymer, copolymer and terpolymer.

As used herein, the term "catalyst component" intends to mean main catalyst component or procatalyst, which, together with a conventional cocatalyst such as an alkyl aluminum and an optional external electron donor, constitutes the catalyst for olefin polymerization.

As used herein, the term "halogen" intends to mean F, Cl, Br, and I.

In a first aspect, the present invention provides a catalyst component for olefin polymerization, comprising a reaction product of:

(1) an adduct represented by general formula (I): $MgX_2 \cdot m(R'OH) \cdot nE \cdot qH_2O$;

(2) at least one titanium compound represented by general formula (II): $Ti(OR)_{4-k}X_k$; and
(3) at least one electron donor compound a and at least one electron donor compound b;

wherein, in the general formula (I), X is Cl or Br; R' is a $C_1$-$C_4$ alkyl; E is at least one o-alkoxybenzoate represented by general formula (III):

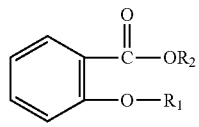

(III)

wherein $R_1$ and $R_2$ are independently chosen from $C_1$-$C_{12}$ linear or branched alkyl, $C_3$-$C_{10}$ cycloalkyl, $C_4$-$C_{10}$ cycloalkylalkyl, $C_6$-$C_{10}$ aryl, $C_7$-$C_{10}$ alkaryl and $C_7$-$C_{10}$ aralkyl; m ranges from 1.0 to 5.0; n ranges from 0 to 0.5; and q ranges from 0 to 0.8;

in the general formula (II), R is a $C_1$-$C_{20}$ alkyl, X is a halogen, k is 0, 1, 2, 3, or 4, and preferably 1, 2, 3, or 4;

the at least one electron donor compound a is chosen from esters of diol represented by general formula (IV):

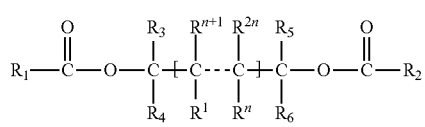

(IV)

wherein $R_1$ and $R_2$ are independently chosen from $C_1$-$C_{10}$ linear or branched alkyl, $C_3$-$C_{20}$ cycloalkyl, $C_4$-$C_{20}$ cycloalkylalkyl, $C_6$-$C_{20}$ aryl, and $C_7$-$C_{20}$ aralkyl, the aryl ring or cycloalkyl ring of which is optionally further substituted by a substituent chosen from halogen, $C_1$-$C_6$ alkyl and $C_1$-$C_6$ alkoxy; $R_3$-$R_6$ and $R^1$-$R^{2n}$ are independently chosen from hydrogen, halogen, substituted or unsubstituted linear or branched $C_1$-$C_{20}$ alkyl, $C_3$-$C_{20}$ cycloalkyl, $C_4$-$C_{20}$ cycloalkylalkyl, $C_6$-$C_{20}$ aryl, $C_7$-$C_{20}$ alkaryl, $C_7$-$C_{20}$ aralkyl, $C_2$-$C_{10}$ alkenyl, $C_{10}$-$C_{20}$ fused aryl, and ester group, each of $R_3$-$R_6$ and $R^1$-$R^{2n}$ comprises optionally one or more heteroatoms as a substitution of a carbon atom or a hydrogen atom or the both, said heteroatom being chosen from N, O, S, Si, P, and halogen, and one or more of $R_3$-$R_6$ and $R^1$-$R^{2n}$ are optionally linked to form a ring; and n is an integer ranging from 0 to 10;

the at least one electron donor compound b is chosen from diether compounds represented by general formula (V):

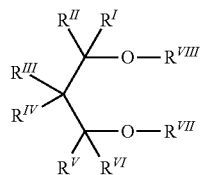

(V)

wherein $R^I$, $R^{II}$, $R^{III}$, $R^{IV}$, $R^V$, and $R^{VI}$ are independently chosen from hydrogen, halogen, linear or branched $C_1$-$C_{20}$ alkyl, $C_3$-$C_{20}$ cycloalkyl, $C_4$-$C_{20}$ cycloalkylalkyl, $C_6$-$C_{20}$ aryl, and $C_7$-$C_{20}$ aralkyl, the aryl ring or cycloalkyl ring of which is optionally further substituted by a substituent chosen from halogen, $C_1$-$C_6$ alkyl and $C_1$-$C_6$ alkoxy; $R^{VII}$ and $R^{\square}$ are independently chosen from linear or branched $C_1$-$C_{20}$ alkyl, $C_3$-$C_{20}$ cycloalkyl, $C_6$-$C_{20}$ aryl, $C_7$-$C_{20}$ alkaryl, and $C_7$-$C_{20}$ aralkyl; and the $R^I$ to $R^{VI}$ groups are optionally linked to form a ring; and the molar ratio of the electron donor compound a to the electron donor compound b ranges from 0.55 to 50.

The adduct represented by the general formula (I) is a magnesium halide-alcohol adduct carrier, and it is generally of spherical shape. In the general formula (I), m ranges from 1.0 to 5.0, and preferably from 1.5 to 3.5; n ranges from 0 to 0.5, preferably from 0 to 0.2, and more preferably is 0 or ranges from 0.005 to 0.2; q ranges from 0 to 0.8. A preferred class of adducts represented by the general formula (I) is magnesium dichloride-ethanol adduct carriers (n=0 in the general formula (I)). Another preferred class of adducts represented by the general formula (I) is multi-component carriers containing o-alkoxybenzoate (0<n≤0.5 in the general formula (I)). It is also contemplated by the inventors that other spherical magnesium halide-alcohol adduct carriers known in the art can be used to replace the adduct of the general formula (I).

An adduct of the general formula (I) is disclosed in Chinese patent applications CN1091748A, CN101050245A and CN101486722A, the relevant contents of which are incorporated herein by reference. In an embodiment, the adduct of the general formula (I) is prepared by combining an anhydrous magnesium halide with a $C_1$-$C_4$ lower alcohol, with the electron donor compound E being optionally added thereto; heating the mixture to, for example, 90-140° C. to form a magnesium halide-alcohol adduct melt; subjecting this magnesium halide-alcohol adduct melt to high shearing action in a dispersion medium and then discharging it into an inert cooling medium, to solidify it to form spherical magnesium halide-alcohol adduct particles; washing and drying the magnesium halide-alcohol adduct particles to obtain spherical carrier. The high shearing action can be accomplished by conventional methods, for example, high-speed stirring method (see, for example, CN1330086A), high-gravity rotary bed method (see, for example, CN1580136A), emulsifier method (see, for example, CN1463990A), and the like. Examples of the dispersion medium include, but are not limited to, kerosene, white oil, silicone oil, liquid paraffin, and vaseline oil. Examples of the cooling medium include, but are not limited to, pentane, hexane, heptane, petroleum ether, and raffinate oil.

The electron donor E, which is optionally present in the adduct carrier, is at least one o-alkoxybenzoate represented by general formula (III):

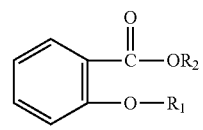

(III)

wherein $R_1$ and $R_2$ are independently chosen from $C_1$-$C_{12}$ linear or branched alkyl, $C_3$-$C_{10}$ cycloalkyl, $C_6$-$C_{10}$ aryl, $C_7$-$C_{10}$ alkaryl, and $C_7$-$C_{10}$ aralkyl, and preferably from methyl, ethyl, n-propyl, isopropyl, n-butyl, and isobutyl.

Examples of the o-alkoxybenzoate include, but are not limited to, methyl o-methoxybenzoate, ethyl o-methoxybenzoate, n-propyl o-methoxybenzoate, isopropyl o-methoxybenzoate, n-butyl o-methoxybenzoate, isobutyl o-methoxybenzoate, methyl o-ethoxybenzoate, ethyl o-ethoxybenzoate, n-propyl o-ethoxybenzoate, isopropyl o-ethoxybenzoate, n-butyl o-ethoxybenzoate, and isobutyl o-methoxybenzoate.

Examples of the titanium compound of the formula (II) include, but are not limited to, titanium tetrachloride, titanium tetrabromide, titanium tetraiodide, tetrabutoxy titanium, tetraethoxy titanium, tributoxy titanium chloride, dibutoxy titanium dichloride, butoxy titanium trichloride, triethoxy titanium chloride, diethoxy titanium dichloride, ethoxy titanium trichloride, titanium trichloride, and mixtures thereof, with titanium tetrachloride being preferred.

The catalyst component of the invention comprises at least one ester of diol represented by the general formula (IV) as internal electron donor compound a:

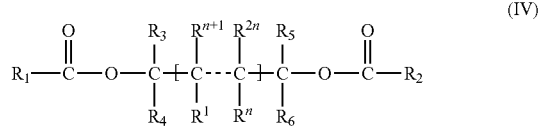

(IV)

wherein $R_1$ and $R_2$ are independently chosen from $C_1$-$C_{10}$ linear or branched alkyl, $C_3$-$C_{20}$ cycloalkyl, $C_4$-$C_{20}$ cycloalkylalkyl, $C_6$-$C_{20}$ aryl, and $C_7$-$C_{20}$ aralkyl, the aryl ring or cycloalkyl ring of which is optionally further substituted by a substituent chosen from halogen, $C_1$-$C_6$ alkyl and $C_1$-$C_6$ alkoxy; $R_3$-$R_6$ and $R^1$-$R^{2n}$ are independently chosen from hydrogen, halogen, substituted or unsubstituted linear or branched $C_1$-$C_{20}$ alkyl, $C_3$-$C_{20}$ cycloalkyl, $C_4$-$C_{20}$ cycloalkylalkyl, $C_6$-$C_{20}$ aryl, $C_7$-$C_{20}$ alkaryl, $C_7$-$C_{20}$ aralkyl, $C_2$-$C_{10}$ alkenyl, $C_{10}$-$C_{20}$ fused aryl, and ester group, each of $R_3$-$R_6$ and $R^1$-$R^{2n}$ comprises optionally one or more heteroatoms as a substitution of a carbon atom or a hydrogen atom or the both, said heteroatom being chosen from N, O, S, Si, P, and halogen, and one or more of $R_3$-$R_6$ and $R^1$-$R^{2n}$ are optionally linked to form a ring; and n is an integer ranging from 0 to 10.

The electron donor compound a is preferably an ester of diol represented by general formula (VI):

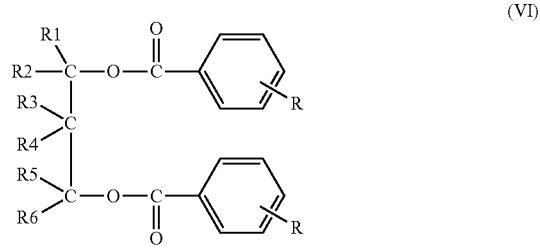

(VI)

wherein $R_1$-$R_6$ are independently chosen from hydrogen and linear or branched $C_1$-$C_{20}$ alkyl, R is independently chosen from hydrogen, halogen, $C_1$-$C_6$ alkyl and $C_1$-$C_6$ alkoxy Examples of the ester of diol useful as the electron donor compound a include, but are not limited to, 1,3-propandiol dibenzoate, 2-methyl-1,3-propandiol dibenzoate, 2-ethyl-1,3-propandiol dibenzoate, 2-propyl-1,3-propandiol dibenzoate, 2-butyl-1,3-propandiol dibenzoate, 2,2-dimethyl-1,3-propandiol dibenzoate, 2-butyl-2-ethyl-1,3-propandiol dibenzoate, 2,2-diethyl-1,3-propandiol dibenzoate, 2-methyl-2-propyl-1,3-propandiol dibenzoate, 2-isoamyl-2-isopropyl-1,3-propandiol dibenzoate, 2,4-pentandiol dibenzoate, 3-ethyl-2,4-pentandiol dibenzoate, 3-ethyl-2,4-pentandiol dibenzoate, 3-propyl-2,4-pentandiol dibenzoate, 3-butyl-2,4-pentandiol dibenzoate, 3,3-dimethyl-2,4-pentandiol dibenzoate, 2-methyl-1,3-pentandiol dibenzoate, 2,2-dimethyl-1,3-pentandiol dibenzoate, 2-ethyl-1,3-pentandiol dibenzoate, 2-butyl-1,3-pentandiol dibenzoate, 2-methyl-1,3-pentandiol dibenzoate, 2-ethyl-1,3-pentandiol dibenzoate, 2-propyl-1,3-pentandiol dibenzoate, 2-butyl-1,3-pentandiol dibenzoate, 2,2-dimethyl-1,3-pentandiol dibenzoate, 2-methyl-1,3-pentandiol dibenzoate, 2,2-dimethyl-1,3-pentandiol dibenzoate, 2-ethyl-1,3-pentandiol dibenzoate, 2-butyl-1,3-pentandiol dibenzoate, 2,2,4-trimethyl-1,3-pentandiol dibenzoate, 3-butyl-3-methyl-2,4-pentandiol dibenzoate, 2,2-dimethyl-1,5-pentandiol dibenzoate, 1,6-hexandiol dibenzoate, 6-hepten-2,4-diol dibenzoate, 2-methyl-6-hepten-2,4-diol dibenzoate, 3-methyl-6-hepten-2,4-diol dibenzoate, 4-methyl-6-hepten-2,4-diol dibenzoate, 5-methyl-6-hepten-2,4-diol dibenzoate, 6-methyl-6-hepten-2,4-diol dibenzoate, 3-ethyl-6-hepten-2,4-diol dibenzoate, 4-ethyl-6-hepten-2,4-diol dibenzoate, 5-ethyl-6-hepten-2,4-diol dibenzoate, 6-ethyl-6-hepten-2,4-diol dibenzoate, 3-propyl-6-hepten-2,4-diol dibenzoate, 4-propyl-6-hepten-2,4-diol dibenzoate, 5-propyl-6-hepten-2,4-diol dibenzoate, 6-propyl-6-hepten-2,4-diol dibenzoate, 3-butyl-6-hepten-2,4-diol dibenzoate, 4-butyl-6-hepten-2,4-diol dibenzoate, 5-butyl-6-hepten-2,4-diol dibenzoate, 6-butyl-6-hepten-2,4-diol dibenzoate, 3,5-dimethyl-6-hepten-2,4-diol dibenzoate, 3,5-diethyl-6-hepten-2,4-diol dibenzoate, 3,5-dipropyl-6-hepten-2,4-diol dibenzoate, 3,5-dibutyl-6-hepten-2,4-diol dibenzoate, 3,3-dimethyl-6-hepten-2,4-diol dibenzoate, 3,3-diethyl-6-hepten-2,4-diol dibenzoate, 3,3-dipropyl-6-hepten-2,4-diol dibenzoate, 3,3-dibutyl-6-hepten-2,4-diol dibenzoate, 3,5-heptandiol dibenzoate, 2-methyl-3,5-heptandiol dibenzoate, 3-methyl-3,5-heptandiol dibenzoate, 4-methyl-3,5-heptandiol dibenzoate, 5-methyl-3,5-heptandiol dibenzoate, 6-methyl-3,5-heptandiol dibenzoate, 3-ethyl-3,5-heptandiol dibenzoate, 4-ethyl-3,5-heptandiol dibenzoate, 5-ethyl-3,5-heptandiol dibenzoate, 3-propyl-3,5-heptandiol dibenzoate, 4-propyl-3,5-heptandiol dibenzoate, 3-butyl-3,5-heptandiol dibenzoate, 2,3-dimethyl-3,5-heptandiol dibenzoate, 2,4-dimethyl-3,5-heptandiol dibenzoate, 2,5-dimethyl-3,5-heptandiol dibenzoate, 2,6-dimethyl-3,5-heptandiol dibenzoate, 3,3-dimethyl-3,5-heptandiol dibenzoate, 4,4-dimethyl-3,5-heptandiol dibenzoate, 6,6-dimethyl-3,5-heptandiol dibenzoate, 2,6-dimethyl-3,5-heptandiol dibenzoate, 3,4-dimethyl-3,5-heptandiol dibenzoate, 3,5-dimethyl-3,5-heptandiol dibenzoate, 3,6-dimethyl-3,5-heptandiol dibenzoate, 4,5-dimethyl-3,5-heptandiol dibenzoate, 4,6-dimethyl-3,5-heptandiol dibenzoate, 4,4-dimethyl-3,5-heptandiol dibenzoate, 6,6-dimethyl-3,5-heptandiol dibenzoate, 3-ethyl-2-methyl-3,5-heptandiol dibenzoate, 4-ethyl-2-methyl-3,5-heptandiol dibenzoate, 5-ethyl-2-methyl-3,5-heptandiol dibenzoate, 3-ethyl-3-methyl-3,5-heptandiol dibenzoate, 4-ethyl-3-methyl-3,5-heptandiol dibenzoate, 5-ethyl-3-methyl-3,5-heptandiol dibenzoate, 3-ethyl-4-methyl-3,5-heptandiol dibenzoate, 4-ethyl-4-methyl-3,5-heptandiol dibenzoate, 5-ethyl-4-methyl-3,5-heptandiol dibenzoate, 2-methyl-3-propyl-3,5-heptandiol dibenzoate, 2-methyl-4-propyl-3,5-heptandiol dibenzoate, 2-methyl-5-propyl-3,5-heptandiol dibenzoate, 3-methyl-3-propyl-3,5-heptandiol dibenzoate, 3-methyl-4-propyl-3,5-heptandiol dibenzoate, 3-methyl-5-propyl-3,5-heptandiol dibenzoate, 4-methyl-3-propyl-3,5-heptandiol dibenzoate, 4-methyl-4-propyl-3,5-heptandiol dibenzoate, 4-methyl-5-propyl-3,5-heptandiol dibenzoate. Among these, esters of pentandiol and esters of heptandiol are preferred.

The esters of diol are disclosed in patent applications CN 1436766A and CN 1552740A, relevant contents of which are incorporated herein by reference.

The catalyst component of the invention comprises at least one diether represented by the general formula (V) as internal electron donor compound b:

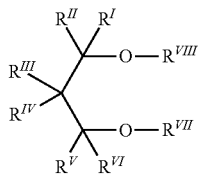

(V)

wherein $R^I$, $R^{II}$, $R^{III}$, $R^{IV}$, $R^V$, and $R^{VI}$ are independently chosen from hydrogen, halogen, linear or branched $C_1$-$C_{20}$ alkyl, $C_3$-$C_{20}$ cycloalkyl, $C_4$-$C_{20}$ cycloalkylalkyl, $C_6$-$C_{20}$ aryl, and $C_7$-$C_{20}$ aralkyl, the aryl ring or cycloalkyl ring of which is optionally further substituted by a substituent chosen from halogen, $C_1$-$C_6$ alkyl and $C_1$-$C_6$ alkoxy; $R^{VII}$ and $R^□$ are independently chosen from linear or branched $C_1$-$C_{20}$ alkyl, $C_3$-$C_{20}$ cycloalkyl, $C_6$-$C_{20}$ aryl, $C_7$-$C_{20}$ alkaryl, and $C_7$-$C_{20}$ aralkyl; and the $R^I$ to $R^{VI}$ groups are optionally linked to form a ring.

The electron donor compound b is preferably a 1,3-diether represented by general formula (VII):

(VII)

wherein $R^1$ and $R^2$ are independently chosen from $C_1$-$C_{18}$ alkyl, $C_3$-$C_{18}$ cycloalkyl, $C_4$-$C_{18}$ cycloalkylalkyl, $C_6$-$C_{18}$ aryl and $C_7$-$C_{18}$ aralkyl, the aryl ring or cycloalkyl ring of which is optionally further substituted by a substituent chosen from halogen, $C_1$-$C_6$ alkyl and $C_1$-$C_6$ alkoxy, and $R^1$ and $R^2$ are optionally linked to form a ring; $R^3$ and $R^4$ are independently a $C_1$-$C_{10}$ alkyl.

Examples of the diether compound useful as the electron donor compound b include, but are not limited to, 2-(2-ethylhexyl)-1,3-dimethoxy propane, 2-isopropyl-1,3-dimethoxy propane, 2-butyl-1,3-dimethoxy propane, 2-secbutyl-1,3-dimethoxy propane, 2-cyclohexyl-1,3-dimethoxy propane, 2-phenyl-1,3-dimethoxy propane, 2-(2-phenylethyl)-1,3-dimethoxy propane, 2-(2-cyclohexylethyl)-1,3-dimethoxy propane, 2-p-chlorophenyl-1,3-dimethoxy propane, 2-(diphenylmethyl)-1,3-dimethoxy propane, 2,2-dicyclohexyl-1,3-dimethoxy propane, 2,2-dicyclopentyl-1,3-dimethoxy propane, 2,2-diethyl-1,3-dimethoxy propane, 2,2-dipropyl-1,3-dimethoxy propane, 2,2-di isopropyl-1,3-dimethoxy propane, 2,2-dibutyl-1,3-dimethoxy propane, 2-methyl-2-propyl-1,3-dimethoxy propane, 2-methyl-2-benzyl-1,3-dimethoxy propane, 2-ethyl-2-methyl-1,3-dimethoxy propane, 2-isopropyl-2-methyl-1,3-dimethoxy propane, 2-methyl-2-phenyl-1,3-dimethoxy propane, 2-methyl-2-cyclohexyl-1,3-dimethoxy propane, 2,2-bis(2-cyclohexylethyl)-1,3-dimethoxy propane, 2-isobutyl-2-methyl-1,3-dimethoxy propane, 2-methyl-2-(2-ethylhexyl)-1,3-dimethoxy propane, 2,2-diisobutyl-1,3-dimethoxy propane, 2,2-diphenyl-1,3-dimethoxy propane, 2,2-dibenzyl-1,3-dimethoxy propane, 2,2-bis(cyclohexylmethyl)-1,3-dimethoxy propane, 2-isobutyl-2-isopropyl-1,3-dimethoxy propane, 2-(1-methylbutyl)-2-isopropyl-1,3-dimethoxy propane, 2-isoamyl-2-isopropyl-1,3-dimethoxy propane, 2-isopropyl-2-phenyl-1,3-dimethoxy propane, 2-sec-butyl-2-phenyl-1,3-dimethoxy propane, 2-benzyl-2-isopropyl-1,3-dimethoxy propane, 2-cyclopentyl-2-isopropyl-1,3-dimethoxy propane, 2-cyclopentyl-2-sec-butyl-1,3-dimethoxy propane, 2-cyclohexyl-2-isopropyl-1,3-dimethoxy propane, 2-cyclohexyl-2-sec-butyl-1,3-dimethoxy propane, 2-isopropyl-2-sec-butyl-1,3-dimethoxy propane, 2-cyclohexyl-2-cyclohexylmethyl-1,3-dimethoxy propane, 9,9-dimethoxymethylfluorene. Among these, 2-isoamyl-2-isopropyl-1,3-dimethoxy propane and 9,9-dimethoxymethylfluorene are particularly preferred.

The 1,3-diether compounds are disclosed in Chinese patents CN1020448C and CN100348624C as well as Chinese patent application CN1141285A, relevant contents of which are incorporated herein by reference.

The molar ratio of the electron donor compound a to the electron donor compound b ranges from 0.55 to 50, preferably from 0.60 to 30, and more preferably from 0.60 to 10.

The catalyst component of the invention comprises a product obtained by reacting the components (a), (b), and (c) according to the proportion of 1 mole of the component (a) in terms of $MgX_2$: 20 to 200 moles of the component (b) (Ti $(OR)_{4-k}X_k$): 0.1 to 0.8 moles of the component (c) (i.e., the total molar number of the electron donor compounds a and b), preferably of 1 mole of the component (a) in terms of $MgX_2$: 30 to 160 moles of the component (b): 0.15 to 0.6 moles of the component (c), and more preferably of 1 mole of the component (a) in terms of $MgX_2$: 40 to 140 moles of the component (b): 0.25 to 0.5 moles of the component (c).

The catalyst component of the invention comprises 1-5 wt % titanium, 10-35 wt % magnesium, 40-75 wt % halogen, and 5-25 wt % internal electron donor including the electron donors a and b.

In a second aspect, the invention provides a process for the preparation of the above-described catalyst component, comprising the steps of (A) suspending the adduct represented by the general formula (I) in the titanium compound represented by the general formula (II) or a mixture of the titanium compound and an inert solvent, and optionally maintaining a period of time;

(B) slowly heating the above suspension to a temperature of from 90° C. to 130° C. with stirring, and adding thereto the electron donor compound a and the electron donor compound b during the heating or after the temperature reaches the target value;

(C) continuously stirring for 0.5 to 3 hours, and then separating the liquid from the solids;

(D) treating the solids from step (C) with the titanium compound represented by the general formula (II) or a mixture of the titanium compound and an inert solvent at 90 to 130° C. for 0.5 to 3 h, and then separating the liquid from the solids;

(E) optionally, repeating the titanium compound treatment of step (D) one or more times; and (F) washing the solids from step (D) or (E), if present, with an inert solvent and then drying, to obtain the solid catalyst component.

In a preferred embodiment, step (A) is carried out by suspending the adduct of the general formula (I) in the titanium compound of the general formula (II) or a mixture of the titanium compound and an inert hydrocarbon solvent such as hexane, heptane, octane, decane, toluene or the like prechilled to a temperature of from −40° C. to 0° C., preferably from −30° C. to 0° C., and more preferably from −20° C. to −10° C., and then maintaining optionally at that temperature for 5 min to 2 h, wherein the concentration of the adduct in the suspension is preferably lower than 200 g/L, and more preferably lower than 100 g/L.

In a preferred embodiment, step (B) is carried out by heating slowly the suspension from step (A) to 90° C. to 130° C., preferably 100° C. to 130° C., over 2 to 6 hours with stirring, and adding thereto the electron donor compound a and the electron donor compound b during the heating or after the temperature reaches the target value, wherein the electron donor compounds a and b may be added together, separately, or stepwise. In a more preferred embodiment, the electron donor compound a or the electron donor compound b or the both are added after the temperature of the suspension have reached above 30° C.

In a preferred embodiment, step (C) is carried out by stirring the mixture from step (B) for 0.5 to 3 hours, and preferably for 0.5 to 1 hour, then stopping the stirring, and separating the liquid from the solids through, for example, settlement and suction filtration.

In a preferred embodiment, step (D) is carried out by treating the solids from step (C) with the titanium compound of the general formula (II) or a mixture of the titanium compound and an inert hydrocarbon solvent such as hexane, heptane, octane, decane, toluene or the like at 90 to 130° C., preferably 100 to 130° C. with stirring for 0.5 to 3 h, then stopping the stirring, and separating the liquid from the solids through, for example, settlement and suction filtration.

In a preferred embodiment, the process of the invention does comprise step (E), i.e., repeating the titanium compound treatment of step (D) one or more times, preferably 1 to 3 times, and more preferably 2 to 3 times.

The process of the invention uses the titanium compound of the general formula (II) in step (A), step (D), and optional step (E). The titanium compounds used in the individual steps may be the same or different, and preferably are the same. The molar number of the total titanium compounds used in said steps ranges from 20 to 200 moles, preferably from 30 to 160 moles, and more preferably from 40 to 140 moles, relative to 1 mole of the adduct of the general formula (I) in terms of $MgX_2$. The molar number of the titanium compound used in step (A) ranges from 4 to 50 moles, preferably from 10 to 45 moles, and more preferably from 15 to 40 moles.

Step (F) of the present process is known per se, and the selection of suitable washing solvent, washing times, and conditions for drying is within the knowledge of those skilled in the art. Suitable inert washing solvents include, but are not limited to, hexane, heptane, octane, decane, and toluene.

In the process of the invention, relative to 1 mole of the adduct of the general formula (I) in terms of $MgX_2$, the electron donor a is generally used in an amount ranging from 0.04 to 0.6 moles, preferably from 0.07 to 0.5 moles, and more preferably from 0.1 to 0.4 moles, the electron donor b is generally used in an amount ranging from 0.01 to 0.5 moles, preferably from 0.05 to 0.45 moles, and more preferably from 0.1 to 0.4 moles, the total amount of the electron donor a and the electron donor b ranges from 0.1 to 0.8 moles, and the molar ratio of the electron donor a to the electron donor b ranges from 0.55 to 50, preferably from 0.60 to 30, and more preferably from 0.60 to 10.

In a third aspect, the present invention provides a catalyst for the polymerization of an olefin of formula $CH_2$=CHR, in which R is hydrogen, or an alkyl or aryl having 1 to 6 carbon atoms, comprising a reaction product of the following components:

(1) the catalyst component according to the invention;
(2) at least one alkylaluminum compound as a cocatalyst; and
(3) optionally, at least one external electron-donor compound.

Alkyl aluminum compounds useful as cocatalyst are well known to a person skilled in the art. The alkyl aluminum compounds are preferably those represented by general formula $AlR_nX_{3-n}$, in which R is independently hydrogen or a $C_1$-$C_{20}$ hydrocarbon radical, and especially an alkyl, an aralkyl, or an aryl; X is independently a halogen, and especially chloride or bromide; and n has a value meeting $0<n\leq 3$. Examples of the alkyl aluminum compound include, but are not limited to, trialkyl aluminums, such as trimethyl aluminum, triethyl aluminum, triisobutyl aluminum, tri-n-butyl aluminum, tri-n-hexyl aluminum, tri-n-octyl aluminum; alkyl aluminum hydrides, such as diethyl aluminum hydride, diisobutyl aluminum hydride; and alkyl aluminum chlorides, such as diethyl aluminum chloride, di-isobutyl aluminum chloride, ethyl aluminum sesquichloride, ethyl aluminum dichloride, with triethyl aluminum and triisobutyl aluminum being preferred. The alkyl aluminum compounds are generally used in such an amount that a molar ratio of Al/Ti ranges from 5 to 2000, preferably from 10 to 1000, and more preferably from 20 to 500.

External electron donor compounds (ED) are well known to those skilled in the art. The external electron donor compound useful as the component (3) of the present catalyst may be chosen from monocarboxylic acids, polycarboxylic acids, carboxylic anhydrides, carboxylic esters, ketones, ethers, alcohols, lactones, organophosphrus compounds, and organosilicon compounds, with the organosilicon compounds being preferred. If used, the external electron donor compounds are used in such an amount that the molar ratio of Al/ED ranges from 2 to 1000, preferably from 2 to 500, more preferably from 2 to 200, and still more preferably from 2.5 to 100.

The external electron donor compound is preferably a silicon compound of general formula $R^1_aR^2_bSi(OR^3)_c$, wherein a and b are an integer ranging from 0 to 2, c is an integer ranging from 1 to 3, and (a+b+c)=4; $R^1$, $R^2$, and $R^3$ are independently $C_1$-$C_{18}$ hydrocarbon radical, optionally containing a heteroatom. Particularly preferred silicon compounds are those wherein a is 1, b is 1, c is 2, at least one of $R^1$ and $R^2$ is chosen from branched alkyl, alkenyl, alkylene, cycloalkyl and aryl having 3 to 10 carbon atoms and optionally containing heteroatom(s), and $R^3$ is a $C_1$-$C_{10}$ alkyl, especially methyl. Examples of preferred silicon compound include, but are not limited to, cyclohexyl methyl dimethoxy silane, di-isopropyl dimethoxy silane, di-n-butyl dimethoxy silane, di-isobutyl dimethoxy silane, diphenyl dimethoxy silane, methyl tert-butyl dimethoxy silane, dicyclopentyl dimethoxy silane, 2-ethylpiperidino tert-butyl dimethoxy silane, 1,1,1-trifluoro-2-propyl 2-ethylpiperidino dimethoxy silane, and 1,1,1-trifluoro-2-propyl methyl dimethoxy silane. Preferred silicon compounds further include those wherein a is 0, c is 3, $R^2$ is a branched alkyl or cycloalkyl having 3 to 10 carbon atoms and optionally containing heteroatom(s), and $R^3$ is methyl. Examples of such silicon compounds include, but are not limited to, cyclohexyl trimethoxy silane, tert-butyl trimethoxy silane, and tert-hexyl trimethoxy silane.

The alkyl aluminum compound (2) and the optional external electron donor compound (3) can contact with the active component (1) separately or as a mixture.

The above catalyst is useful in the homopolymerization or copolymerization of olefin $CH_2$=CHR (wherein R is H, or an alkyl or aryl having 1 to 6 carbon atoms), especially propylene.

Thus, in a fourth aspect, the present invention relates to a process for polymerizing olefin, comprising contacting an olefin of formula $CH_2$=CHR, in which R is H, or an alkyl or aryl having 1 to 6 carbon atoms, and optionally another kind of said olefin as a comonomer, and optionally a diene as a second comonomer, with the catalyst of the invention under polymerization conditions; and recovering the resultant polymer.

The polymerization of olefin(s) may be carried out in liquid phase of liquid monomer or a solution of monomer in an inert solvent, or in gas phase, or in a combination of gas phase and liquid phase, according to the known processes. The polymerization is generally carried out at a temperature of from 0° C. to 150° C., and preferably from 60° C. to 90° C., and at normal or higher pressure. In the polymerization, hydrogen as a regulator of polymer molecular weight may be added to the polymerization reactor to adjust the molecular weight and melt index of a polymer.

In a preferred embodiment, the present process for polymerizing olefin is a process for the polymerization of propylene. The polymerization of propylene may be carried out in liquid phase of liquid monomer or a solution of monomer in an inert solvent, or in gas phase, or in a combination of gas phase and liquid phase, according to the known processes. The polymerization is generally carried out at a temperature of from 0° C. to 120° C., and preferably from 60° C. to 80° C., and at normal or higher pressure. In the polymerization, hydrogen as a regulator of polymer molecular weight may be added to the polymerization reactor to adjust the molecular weight and melt index of a polymer.

The catalyst component, the alkyl aluminum and the optional external electron donor compound may be added to the polymerization reactor separately, or as a mixture, or after having subjected to propylene prepolymerization carried out according to a prepolymerization process well-known in the art.

In a preferred embodiment, the present invention provides a process for producing a low ash polypropylene directly in a polymerization reactor, comprising performing the polymerization of propylene in the presence of a catalyst to obtain directly the low ash polypropylene without a deashing post-treatment, wherein the average residence time of the monomer in the polymerization reactor is preferably above 1.5 hours, and wherein the catalyst comprises a reaction product of the following components:

(1) the solid catalyst component of the invention;
(2) the alkyl aluminum compound, which is used in such an amount that the molar ratio of Al/Ti ranges from 10 to 300, preferably from 20 to 200, more preferably from 20 to 150, and still more preferably from 30 to 100; and
(3) optionally, the above-described external electron donor, and preferably the organic silicon compound, which, when used, is used in such an amount that the molar ratio of Al/ED ranges from 5 to 500, and preferably from 10 to 200.

In a fifth aspect, the present invention provides a propylene polymer prepared by the olefin polymerization process of the invention. Preferably, this propylene polymer has an ash content of lower than 100 ppm, more preferably lower than 50 ppm, and more preferably lower than 30 ppm. The propylene polymer of the invention has an isotacticity index (II) of larger than 96.7%, preferably larger than 97.5%, and more preferably larger than 98.0%, and the isotacticity index may be adjusted depending on the intending use of the polymer. The propylene polymer of the invention may have a melt index (MI) of larger than 0.1 g/10 min, and preferably from 1.0 to 100 g/10 min; and a molecular weight distribution (Mw/Mn) of larger than 5.5, and preferably from 6 to 8.

The propylene polymer of the invention is characterized by a low ash content, a high and adjustable isotacticity, and a broad molecular weight distribution, can be used to produce films such as capacitor film, fibers such as artificial short fiber for spinning, and non-woven fabrics such as spinning non-woven fabrics, and the like, and can also be used to prepare medical articles and the like.

EXAMPLE

The following examples are provided to further illustrate the present invention and by no means intend to limit the scope thereof.

Testing Methods:

1. Melt index (MI) of a polymer: measured according to ASTM D 1238-99.
2. Isotacticity index (II) of a polymer: measured by heptane extraction method carried out as follows: 2 g of dry polymer sample is extracted with boiling heptane in an extractor for 6 hours, then the residual substance is dried to constant weight, and the ratio of the weight of the residual polymer (g) to 2 (g) is regarded as isotacticity index.
3. Molecular weight distribution (Mw/Mn) of a polymer: measured by gel permeation chromatography (GPC) method.
4. Ash content of a polymer: measured according to GB/T 9345-1988.

Example 1

Preparation of a Spherical Catalyst Component

To a 300 ml glass reactor equipped with a stirrer, in which reactor air had been fully replaced with high pure $N_2$, were charged with 90 ml of titanium tetrachloride and 10 ml of hexane, and the contents were cooled to −20° C. To the reactor was added 8 g of spherical magnesium dichloride-alcohol adduct carrier ($MgCl_2.2.6C_2H_5OH$, prepared according to Example 1 of Chinese patent application CN1330086A). The contents were heated slowly over 3 hours to 40° C. with stirring, and then 1.5 ml of 2,4-pentandiol dibenzoate and 1.5 ml of 2-isoamyl-2-isopropyl-1,3-dimethoxy propane were added thereto. The contents were continuously heated to 110° C. and maintained at that temperature for 0.5 hours, and then the liquid was removed by suction filtration. Titanium tetrachloride (100 ml) was added to the reactor, the contents were heated to 110° C. and maintained at that temperature for 1 hour, and then the liquid was removed by suction filtration. The titanium tetrachloride treatment was repeated twice. Next, the resultant solids were washed with hexane five times and dried under vacuum, to give a spherical catalyst component.

Propylene Polymerization

A 5 L autoclave was purged with nitrogen gas flow, and then under nitrogen atmosphere, a 0.5M solution of triethylaluminum in hexane, a 0.1M solution of cyclohexyl methyl dimethoxy silane (CHMMS) in hexane, and an amount of the spherical catalyst component suspended in 10 ml of hexane were introduced thereto. The amounts of triethylaluminum and cyclohexyl methyl dimethoxy silane represented as Al/Ti ratio and Al/Si ratio respectively are shown in Table 1 below. 2 liters (standard volume) of hydrogen gas and 2.3 liters of liquid propylene were introduced to the autoclave, the temperature inside the autoclave was brought to 70° C., and the polymerization was allowed to continue for 1.5 hours. The results are shown in Table 1 below.

Example 2

A spherical catalyst component was prepared according to the procedure described in Example 1, except that the amount of 2,4-pentandiol dibenzoate was changed to 1.0 ml and the amount of 2-isoamyl-2-isopropyl-1,3-dimethoxy propane was changed to 1.3 ml.

Propylene polymerization was performed according to the procedure described in Example 1. The results are shown in Table 1 below.

Example 3

A spherical catalyst component was prepared according to the procedure described in Example 1, except that the amount of 2-isoamyl-2-isopropyl-1,3-dimethoxy propane was changed to 1.3 ml.

Propylene polymerization was performed according to the procedure described in Example 1. The results are shown in Table 1 below.

Example 4

A spherical catalyst component was prepared according to the procedure described in Example 1, except that a spherical magnesium dichloride-alcohol adduct carrier containing ethyl o-methoxybenzoate ($MgCl_2.0.015C_{10}H_{12}O_3.2.6C_2H_5OH$, prepared according to Example 1 of Chinese patent application CN101486722A) was used to replace said spherical magnesium dichloride-alcohol adduct carrier, the amount of 2,4-pentandiol dibenzoate was changed to 1.3 ml and the amount of 2-isoamyl-2-isopropyl-1,3-dimethoxy propane was changed to 1.3 ml.

Propylene polymerization was performed according to the procedure described in Example 1. The results are shown in Table 1 below.

Example 5

A spherical catalyst component was prepared according to the procedure described in Example 1, except that 1.3 ml of 3,5-heptandiol dibenzoate was used to replace the 2,4-pentandiol dibenzoate and the amount of 2-isoamyl-2-isopropyl-1,3-dimethoxy propane was changed to 1.3 ml.

Propylene polymerization was performed according to the procedure described in Example 1. The results are shown in Table 1 below.

Example 6

Preparation of a Spherical Catalyst Component

To a 300 ml glass reactor equipped with a stirrer, in which reactor air had been fully replaced with high pure $N_2$, were charged with 90 ml of titanium tetrachloride and 10 ml of hexane, and the contents were cooled to −20° C. To the reactor was added 8 g of spherical magnesium dichloride-alcohol adduct carrier ($MgCl_2.2.6C_2H_5OH$, prepared according to Example 1 of Chinese patent application CN1330086A). The contents were heated slowly over 2 hours to 20° C. with stirring, then 1.5 ml of 2,4-pentandiol dibenzoate and 1.5 ml of 2-isoamyl-2-isopropyl-1,3-dimethoxy propane were added thereto, and the contents was maintained at that temperature for 5 min. The contents were continuously heated to 110° C. and maintained at that temperature for 0.5 hours, and then the liquid was removed by suction filtration. Titanium tetrachloride (80 ml) was added to the reactor, the contents was heated to 110° C. and maintained at that temperature for 0.5 hours, and then the liquid was removed by suction filtration. The titanium tetrachloride treatment was repeated once. Next, the resultant solids were washed with hexane five times and dried under vacuum, to give a spherical catalyst component.

Propylene polymerization was performed according to the procedure described in Example 1. The results are shown in Table 1 below.

Comparative Example 1

A spherical catalyst component was prepared according to the procedure described in Example 1, except that the amount of 2,4-pentandiol dibenzoate was changed to 0.8 ml and the amount of 2-isoamyl-2-isopropyl-1,3-dimethoxy propane was changed to 2.0 ml.

Propylene polymerization was performed according to the procedure described in Example 1. The results are shown in Table 1 below.

Comparative Example 2

A spherical catalyst component was prepared according to the procedure described in Example 1, except that the 2-isoamyl-2-isopropyl-1,3-dimethoxy propane was omitted.

Propylene polymerization was performed according to the procedure described in Example 1. The results are shown in Table 1 below.

Comparative Example 3

A spherical catalyst component was prepared according to the procedure described in Example 1, except that the 2,4-pentandiol dibenzoate was omitted.

Propylene polymerization was performed according to the procedure described in Example 1. The results are shown in Table 1 below.

Comparative Example 4

A spherical catalyst component was prepared according to the procedure described in Example 1, except that 6 mmol of 9,9-dimethoxymethylfluorene was used to replace the 1.5 ml of 2,4-pentandiol dibenzoate and the 1.5 ml of 2-isoamyl-2-isopropyl-1,3-dimethoxy propane.

Propylene polymerization was performed according to the procedure described in Example 1. The results are shown in Table 1 below.

Comparative Example 5

A spherical catalyst component was prepared according to the procedure described in Example 6, except that 1.6 ml of di-isobutyl phthalate was used to replace the 1.5 ml of 2,4-pentandiol dibenzoate and the 1.5 ml of 2-isoamyl-2-isopropyl-1,3-dimethoxy propane.

Propylene polymerization was performed according to the procedure described in Example 1. The results are shown in Table 1 below.

TABLE 1

| Ex. No. | a/b (mol/mol) | Polymerization conditions Al/Ti (mol/mol) | Al/ED (mol/mol) | Polymerization activity (kg pp/g cat.) | II of polymer (%) | MI of polymer (g/10 min) | Molecular weight distribution of polymer, $M_w/M_n$ | Ash content of polymer (ppm) |
|---|---|---|---|---|---|---|---|---|
| Ex. 1 | 1.1 | 160 | ☐ | 212.0 | 97.7 | 4.9 | 6.5 | 33 |
| Ex. 2 | 0.8 | 90 | ☐ | 242.7 | 97.2 | 5.5 | 6.3 | 17 |
|  |  |  | 50 | 198.9 | 98.8 | 2.3 | 6.5 | 42 |
| Ex. 3 | 1.4 | 600 | ☐ | 223.0 | 98.7 | 3.0 | 6.4 | 121 |
|  |  | 390 | ☐ | 211.0 | 97.7 | 5.1 | 6.8 | 80 |
|  |  | 290 | ☐ | 213.2 | 98.0 | 4.8 | 6.6 | 58 |
|  |  | 190 | ☐ | 220.9 | 98.1 | 4.0 | 6.7 | 38 |
|  |  | 90 | ☐ | 208.3 | 96.7 | 4.3 | 6.7 | 23 |
|  |  | 60 | ☐ | 190.3 | 96.7 | 3.7 | 6.5 | 18 |
| Ex. 4 | 1.0 | 90 | ☐ | 206.3 | 98.1 | 2.0 | 6.2 | 23 |
| Ex. 5 | 0.6 | 90 | ☐ | 230.2 | 97.6 | 9.7 | 6.5 | 19 |
| Ex. 6 | 1.4 | 220 | ☐ | 160.7 | 98.4 | 2.5 | 6.5 | 43 |
| Comp. Ex. 1 | 0.3 | 190 | ☐ | 100.2 | 97.6 | 3.0 | 6.3 | 60 |
| Comp. Ex. 2 | — | 500 | 25 | 70.0 | 97.0 | 1.5 | 7.0 | 240 |
| Comp. Ex. 3 | — | 80 | ☐ | 124.1 | 97.2 | 15.1 | 4.8 | 34 |
| Comp. Ex. 4 | — | 480 | 25 | 104.7 | 98.6 | 5.0 | 4.4 | 130 |
| Comp. Ex. 5 | — | 670 | 17.5 | 62.0 | 98.3 | 10.9 | 5.5 | 237 |
|  |  | 290 | 7.5 | 48.3 | 98.7 | 6.9 | 5.8 | 149 |
|  |  | 190 | 5 | 48.0 | 98.6 | 7.6 | 5.8 | 112 |
|  |  | 80 | 2.5 | 22.8 | 97.9 | 5.4 | 5.7 | 132 |
|  |  | 50 | 1.5 | 10.4 | 97.9 | 4.9 | 5.7 | 232 |

Notation:
☐ indicates that no external electron donor is used.

It can be seen from the comparison between the data for the Examples and the data for the Comparative Examples shown in Table 1 that the catalysts of the invention have polymerization activities which are very high and markedly higher than that of those catalysts containing only a single internal electron donor; that the polymers obtained by using the catalysts of the invention have relatively high isotacticity even when no external electron donor is used; and that the polymers obtained by using the catalysts of the invention have a broader molecular weight distribution and a lower ash content.

FIG. 1 is a plot of polymerization activity vs. Al/Ti molar ratio for the catalysts obtained in Example 3 and Comparative Example 5. It can be clearly seen from FIG. 1 that, compared with the conventional catalyst of Comparative Example 5, the catalyst of the invention has a remarkably enhanced activity, and can retain the high activity over a relatively larger range of Al/Ti molar ratio, while the activity of the conventional catalyst significantly decreases as the Al/Ti molar ratio decreases, especially when the Al/Ti molar ratio is low.

Figure 2:
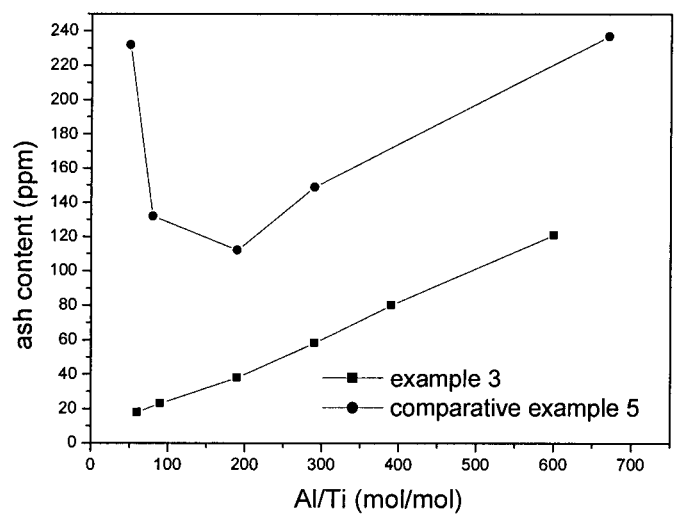
FIG. 2 is a plot of ash content of polymer vs. Al/Ti molar ratio for Example 3 and Comparative Example 5.

FIG. 2 is a plot of ash content of polymer vs. Al/Ti molar ratio for Example 3 and Comparative Example 5. It can be clearly seen from FIG. 2 that, when the same Al/Ti molar ratio is used in the polymerization, the polypropylene resin obtained by using the catalyst of the invention has significantly lower ash content than the polypropylene obtained by using the conventional catalyst. Furthermore, since the catalyst of the invention still exhibits a high activity at a relatively low Al/Ti molar ratio, it is possible to produce a polypropylene having a very low ash content.

The patents, patent applications and testing methods cited in the specification are incorporated herein by reference.

While the invention has been described with reference to exemplary embodiments, it will be understood by those skilled in the art that various changes and modifications may be made without departing from the spirit and scope of the invention. Therefore, the invention is not limited to the particular embodiments disclosed as the best mode contemplated for carrying out this invention, but the invention will include all embodiments falling within the scope of the appended claims.

What is claimed is:

1. A catalyst component for olefin polymerization, comprising a reaction product of:

(1) an adduct represented by general formula (I): $MgX_2 \cdot mR'OH \cdot nE \cdot qH_2O$;

(2) at least one titanium compound represented by general formula (II): $Ti(OR)_{4-k}X_k$; and (3) at least one electron donor compound a and at least one electron donor compound b;

wherein, in the general formula (I), X is Cl or Br; R' is a $C_1$-$C_4$ alkyl; E is at least one o-alkoxybenzoate represented by general formula (III):

(III)

wherein $R_1$ and $R_2$ are independently chosen from $C_1$-$C_{12}$ linear or branched alkyl, $C_3$-$C_{10}$ cycloalkyl, $C_4$-$C_{10}$ cycloalkylalkyl, $C_6$-$C_{10}$ aryl, $C_7$-$C_{10}$ alkaryl and $C_7$-$C_{10}$ aralkyl; m ranges from 1.0 to 5.0; n ranges from 0 to 0.5; and q ranges from 0 to 0.8;

in the general formula (II), R is a $C_1$-$C_{20}$ alkyl, X is a halogen, and k is 0, 1, 2, 3, or 4;

the at least one electron donor compound a is chosen from esters of diol represented by general formula (IV):

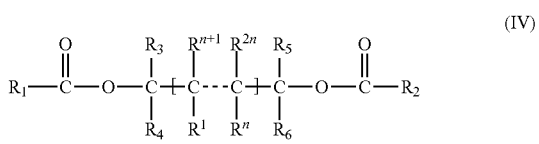

(IV)

wherein $R_1$ and $R_2$ are independently chosen from $C_1$-$C_{10}$ linear or branched alkyl, $C_3$-$C_{20}$ cycloalkyl, $C_4$-$C_{20}$ cycloalkylalkyl, $C_6$-$C_{20}$ aryl, and $C_7$-$C_{20}$ aralkyl, the aryl ring or cycloalkyl ring of which is optionally further substituted by a substituent chosen from halogen, $C_1$-$C_6$ alkyl and $C_1$-$C_6$ alkoxy; $R_3$-$R_6$ and $R^1$-$R^{2n}$ are independently chosen from hydrogen, halogen, substituted or unsubstituted linear or branched $C_1$-$C_{20}$ alkyl, $C_3$-$C_{20}$ cycloalkyl, $C_4$-$C_{20}$ cycloalkylalkyl, $C_6$-$C_{20}$ aryl, $C_7$-$C_{20}$ alkaryl, $C_7$-$C_{20}$ aralkyl, $C_2$-$C_{10}$ alkenyl, $C_{10}$-$C_{20}$ fused aryl, and ester group, each of $R_3$-$R_6$ and $R^1$-$R^{2n}$ comprises optionally one or more heteroatoms as a substitution of a carbon atom or a hydrogen atom or both, said heteroatom being chosen from N, O, S, Si, P, and halogen, and one or more of $R_3$-$R_6$ and $R^1$-$R^{2n}$ are optionally linked to form a ring; and n is an integer ranging from 0 to 10;

the at least one electron donor compound b is chosen from diether compounds represented by general formula (V):

(V)

wherein $R^I$, $R^{II}$, $R^{III}$, $R^{IV}$, $R^V$, and $R^{VI}$ are independently chosen from hydrogen, halogen, linear or branched $C_1$-$C_{20}$ alkyl, $C_3$-$C_{20}$ cycloalkyl, $C_4$-$C_{20}$ cycloalkylalkyl, $C_6$-$C_{20}$ aryl, and $C_7$-$C_{20}$ aralkyl, the aryl ring or cycloalkyl ring of which is optionally further substituted by a substituent chosen from halogen, $C_1$-$C_6$ alkyl and $C_1$-$C_6$ alkoxy; $R^{VII}$ and $R^{VIII}$ are independently chosen from linear or branched $C_1$-$C_{20}$ alkyl, $C_3$-$C_{20}$ cycloalkyl, $C_6$-$C_{20}$ aryl, $C_7$-$C_{20}$ alkaryl, and $C_7$-$C_{20}$ aralkyl; and the $R^I$ to $R^{VI}$ groups are optionally linked to form a ring; and the molar ratio of the electron donor compound a to the electron donor compound b ranges from 0.60 to 10.

2. The catalyst component of claim 1, wherein in the general formula (I), m ranges from 1.5 to 3.5, and n ranges from 0 to 0.2.

3. The catalyst component of claim 1, wherein in the general formula (I), m ranges from 1.5 to 3.5, and n is 0 or ranges from 0.005 to 0.2.

4. The catalyst component of claim 1, wherein in the general formula (III), $R_1$ and $R_2$ are independently chosen from methyl, ethyl, n-propyl, isopropyl, n-butyl, and isobutyl.

5. The catalyst component of claim 1, wherein the adduct represented by the general formula (I) is of spherical shape.

6. The catalyst component of claim 1, wherein the electron donor compound a is an ester of diol represented by general formula (VI):

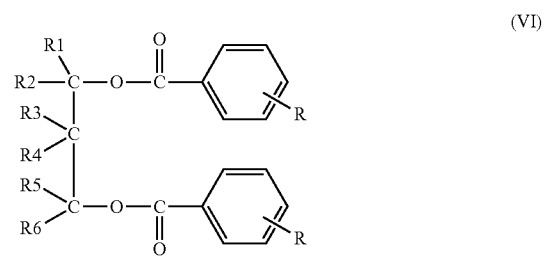

(VI)

wherein $R_1$-$R_6$ are independently chosen from hydrogen and linear or branched $C_1$-$C_{20}$ alkyl, R is independently chosen from hydrogen, halogen, $C_1$-$C_6$ alkyl and $C_1$-$C_6$ alkoxy.

7. The catalyst component of claim 1, wherein the electron donor compound b is a 1,3-diether represented by general formula (VII):

$$R^1R^2C(CH_2OR^3)(CH_2OR^4) \quad (VII)$$

wherein $R^1$ and $R^2$ are independently chosen from $C_1$-$C_{18}$ alkyl, $C_3$-$C_{18}$ cycloalkyl, $C_4$-$C_{18}$ cycloalkylalkyl, $C_6$-$C_{18}$ aryl and $C_7$-$C_{18}$ aralkyl, the aryl ring or cycloalkyl ring of which is optionally further substituted by a substituent chosen from halogen, $C_1$-$C_6$ alkyl and $C_1$-$C_6$ alkoxy, and $R^1$ and $R^2$ are optionally linked to form a ring; $R^3$ and $R^4$ are independently a $C_1$-$C_{10}$ alkyl.

8. The catalyst component of claim 1, wherein the catalyst component is of spherical shape.

9. A process for the preparation of the catalyst component according to claim 1, comprising the steps of
(A) suspending the adduct represented by the general formula (I) in the titanium compound represented by the general formula (II) or a mixture of the titanium compound and an inert solvent, and optionally maintaining a period of time;
(B) slowly heating the above suspension to a temperature of from 90° C. to 130° C. with stirring, and adding thereto the electron donor compound a and the electron donor compound b during the heating or after the temperature reaches the target value;
(C) continuously stirring for 0.5 to 3 hours, and then separating the liquid from the solids;
(D) treating the solids from step (C) with the titanium compound represented by the general formula (II) or a mixture of the titanium compound and an inert solvent at 90 to 130° C. for 0.5 to 3 h, and then separating the liquid from the solids;
(E) optionally, repeating the titanium compound treatment of step (D) one or more times; and
(F) washing the solids from step (D) or (E), if present, with an inert solvent and then drying, to obtain the solid catalyst component.

10. The process of claim 9, having at least one of the following features:
step (A) is carried out by suspending the adduct of the general formula (I) in the titanium compound of the general formula (II) or a mixture of the titanium compound and an inert hydrocarbon solvent prechilled to a temperature of from −40° C. to 0° C., and then maintaining optionally at that temperature for 5 min to 2 h;
in step (A), the concentration of the adduct in the resultant suspension is lower than 200 g/L;
step (B) is carried out by heating slowly the suspension from step (A) to 90° C. to 130° C. with stirring, and adding thereto the electron donor compound a and the electron donor compound b during the heating or after the temperature reaches the target value, wherein the electron donor compounds a and b may be added together, separately, or stepwise;

in step (B), the electron donor compound a or the electron donor compound b or the both are added after the temperature of the suspension have reached above 30° C.;

step (C) is carried out by stirring the mixture from step (B) for 0.5 to 3 hours, then stopping the stirring, and separating the liquid from the solids;

step (D) is carried out by treating the solids from step (C) with the titanium compound of the general formula (II) or a mixture of the titanium compound and an inert hydrocarbon solvent at 90 to 130° C. with stirring for 0.5 to 3 h, then stopping the stirring, and separating the liquid from the solids;

the process comprises step (E), i.e., repeating the titanium compound treatment of step (D) one or more times;

the titanium compounds used in step (A), step (D), and optional step (E) are the same or different, the molar number of the total titanium compounds used in said steps ranges from 20 to 200 moles, relative to 1 mole of the adduct of the general formula (I) in terms of $MgX_2$;

the molar number of the titanium compound used in step (A) ranges from 4 to 50 moles, relative to 1 mole of the adduct of the general formula (I) in terms of $MgX_2$;

the electron donor a is used in an amount ranging from 0.04 to 0.6 moles, relative to 1 mole of the adduct of the general formula (I) in terms of $MgX_2$;

the electron donor b is used in an amount ranging from 0.01 to 0.5 moles, relative to 1 mole of the adduct of the general formula (I) in terms of $MgX_2$;

the total amount of the electron donor a and the electron donor b ranges from 0.1 to 0.8 moles, relative to 1 mole of the adduct of the general formula (I) in terms of $MgX_2$; and the molar ratio of the electron donor a to the electron donor ranges from 0.60 to 10.

11. A catalyst for the polymerization of an olefin of formula $CH_2=CHR$, in which R is hydrogen, or an alkyl or aryl having 1 to 6 carbon atoms, comprising a reaction product of the following components:
(1) the catalyst component of claim 1;
(2) at least one alkyl aluminum compound as a cocatalyst; and
(3) optionally, at least one external electron-donor compound.

12. The catalyst of claim 11, having at least one of the following features:
the alkyl aluminum compound is a compound of general formula $AlR_nX_{3-n}$, in which R is independently hydrogen or a $C_1$-$C_{20}$ hydrocarbon radical; X is independently a halogen; and n has a value meeting $0<n\leq 3$;
the alkyl aluminum compound is used in such an amount that the molar ratio of Al/Ti ranges from 5 to 2000;
the external electron donor compound is used in such an amount that the molar ratio of Al/ED ranges from 2 to 1000; and
the external electron donor compound is a silicon compound of general formula $R^1_a R^2_b Si(OR^3)_c$, wherein a and b are an integer ranging from 0 to 2, c is an integer ranging from 1 to 3, and $(a+b+c)=4$; $R^1$, $R^2$, and $R^3$ are independently $C_1$-$C_{18}$ hydrocarbon radical, optionally containing a heteroatom.

13. A process for polymerizing olefin, comprising contacting an olefin of formula $CH_2=CHR$, in which R is H, or an alkyl or aryl having 1 to 6 carbon atoms, and optionally another kind of said olefin as a comonomer, and optionally a diene as a second comonomer, with the catalyst of claim 11 under polymerization conditions; and recovering the resultant polymer.

14. The process of claim 13 used to produce directly a low ash polypropylene in a polymerization reactor.

15. The process of claim 14, wherein the molar ratio of Al/Ti in the used catalyst ranges from 10 to 300.

16. The process of claim 15, wherein the molar ratio of Al/Ti in the used catalyst ranges from 20 to 200.

17. The process of claim 14, wherein no external electron donor is used.

18. The process of claim 14, wherein the external electron donor is used, and it is an organic silicon compound used in such an amount that the molar ratio of Al/ED ranges from 5 to 500.

19. The process of claim 18, wherein the external electron donor is used in such an amount that the molar ratio of Al/ED ranges from 10 to 200.

20. The process of claim 14, wherein the resultant polypropylene has an ash content of lower than 100 ppm, preferably lower than 50 ppm, and more preferably lower than 30 ppm.

* * * * *